May 31, 1949.  W. G. SCHMIDT  2,471,781
ELECTRIC ACCUMULATOR OF THE BIPOLAR TYPE
Filed Sept. 19, 1944  2 Sheets-Sheet 1

INVENTOR.
Wilhelm Georg Schmidt
BY Wm. Wallace White
Attorney

May 31, 1949. W. G. SCHMIDT 2,471,781
ELECTRIC ACCUMULATOR OF THE BIPOLAR TYPE
Filed Sept. 19, 1944 2 Sheets-Sheet 2
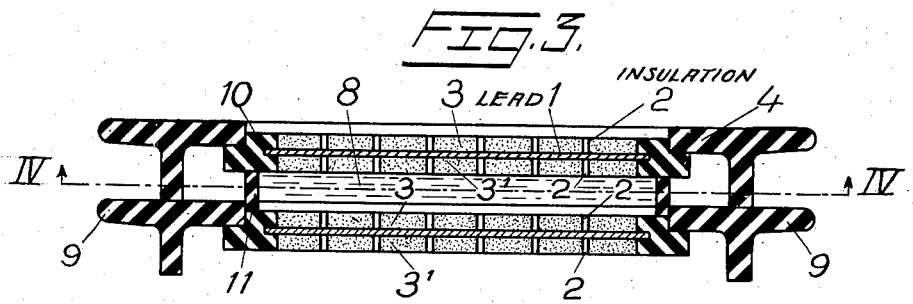
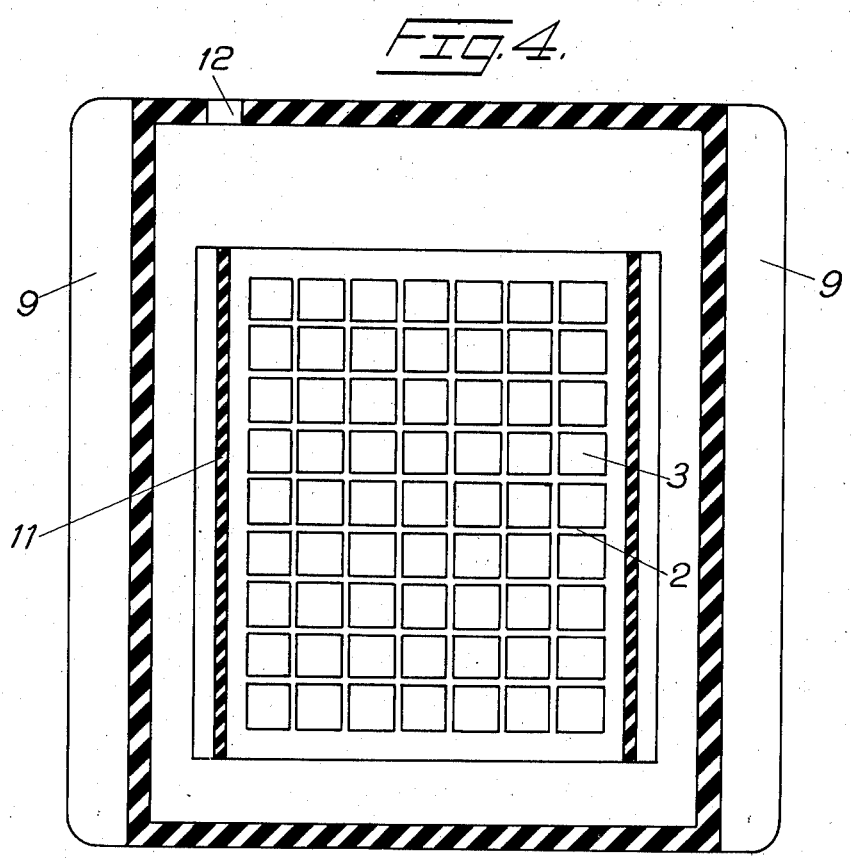
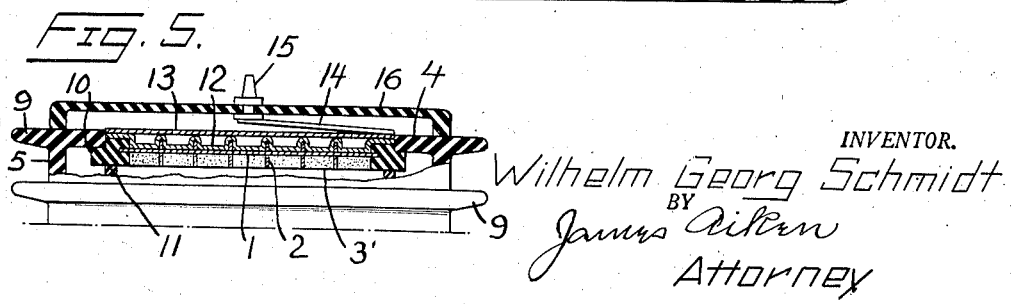
INVENTOR.
Wilhelm Georg Schmidt
BY James Aiken
Attorney Patented May 31, 1949

2,471,781

UNITED STATES PATENT OFFICE 2,471,781

ELECTRIC ACCUMULATOR OF THE BIPOLAR TYPE

Wilhelm Georg Schmidt, Saltsjobaden, Sweden, assignor to Allmanna Svenska Elektriska Aktiebolaget, Vasteras, Sweden, a corporation of Sweden Application September 19, 1944, Serial No. 554,789
In Sweden June 29, 1943

3 Claims. (Cl. 136—12)

The present invention has for its object a lead accumulator which will have a large capacity with respect to its weight and will not have the disadvantages of the earlier accumulators.

According to the present invention the accumulator is built up of bipolar electrode plates piled up against each other with a space between the plates for the electrolyte and further the plates consist of a grating of an insulating material, into which is cast or pressed a tight electrically conducting sheet, which separates the two sides of the plate, the pockets on the two sides of the plate being formed by the grating and said separating sheet being filled with the positive and negative active material respectively.

On the accompanying drawings different forms of the invention are shown.

Figure 1:
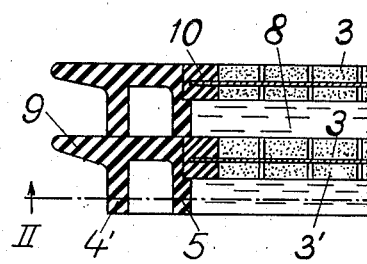
Figure 1A:
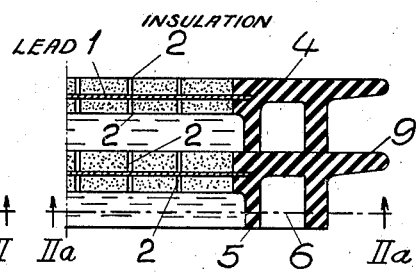
Figure 2:
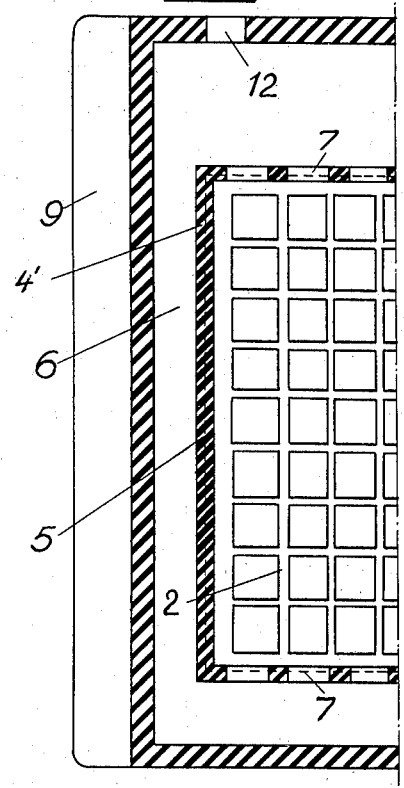
Figure 2A:
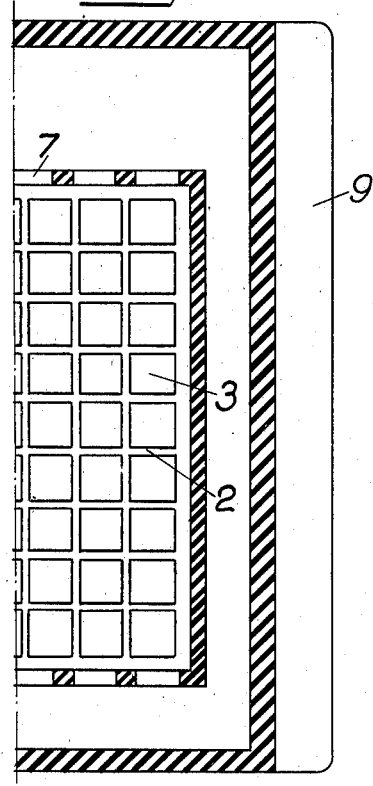

On the accompanying drawings, Fig. 1 is a horizontal section through two plates piled up against each other, and showing one form of the invention. Fig. 2 is a vertical section through one of the accumulator plates along the line II—II of Fig. 1. Figs. 1a and 2a are views of a modification corresponding to Figs. 1 and 2 respectively, Fig. 2a being taken on the line IIa—IIa of Fig. 1a. Fig. 3 is a horizontal section showing another form of the invention. Fig. 4 is a section on the line IV—IV of Fig. 3. Fig. 5 is a plan view—partly in section—showing one end of an accumulator.

In the form shown in Figs. 1 and 1a, the grating is surrounded by a frame with a U-shaped groove which, when the accumulator is assembled, forms a closed channel around the grating, which channel facilitates formation of a circulation of the electrolyte, whereas in the form shown in Figs. 3 and 4 the circulation of the electrolyte is guided by vertical channels between the plates.

In the Figs. 1, 2, 1a and 2a, the numeral 1 designates a thin sheet of lead, which is embedded in a grating 2 of insulating material, which grating is surrounded in Figs. 1 and 2 by a thin frame 10 also of insulating material. The pockets on the two sides of the grating are filled with positive and negative active material 3 and 3¹ respectively. The whole grating is inserted in the frame 4 of insulating material, which frame is provided with U-shaped grooves 6 (Figs. 1 and 1a) and with cooling fins 9. The U-shaped grooves 6 are formed between flanges 4¹ and flanges or walls 5 projecting perpendicularly from the frame 4, and when the plates are piled up against each other, the grooves 6 will form a closed channel around the electrode plate and the electrolyte space 8 between the plates. This channel is in communication by openings 7 with the electrolyte space between the plates. After the accumulator is assembled, the electrolyte is filled into it through the opening 12, Fig. 2.

In Figs. 1 and 2 the lead sheet 1 is shown cast into the grating 2, which grating is limited by the thin frame 10, but it is of course also possible, as shown in Figs. 1a and 2a, to cast or press the lead sheet 1 directly into the frame 4, the grating 2 in this case being made in one piece with the frame 4.

In the form shown in Figs. 3 and 4, the function of the flange 5 is performed by vertical shields 11, so that also in this form a decided circulation of the electrolyte is obtained. By the fact that the conductor plate 1 is cast or pressed into the grating the advantage is obtained that the two sides of the electrode plate are reliably separated from each other so that no leakage from one side of it to the other can take place. Further, the active substances in the pockets of the grating are in good electrical contact with the current collecting lead sheet, which contact may be improved by roughening the surface of the lead sheet in some suitable manner. In order to reliably connect the two parts of the grating on the two sides of the lead sheet, the latter may be provided with small holes, which, when the grating is pressed or cast, are filled with the same material as that forming the grating and thus forming rivets effectively joining the parts of the grids on the opposite sides of the lead sheets.

The arrangement of the U-formed grooves 6 or the vertical shields or walls 11 respectively cause a decided circulation of the electrolyte, so that in the space 8 it will move upwards due to its rising temperature and then flow down through the channels 6 or outside the shields 11, where it is effectively cooled by contact with the flanges 4¹, this cooling action being considerably improved by the cooling fins 9. In order to provide a space for spare electrolytes and a space for gases developed during charging and discharging, the upper part of the channel 6 may be made larger than the other parts.

Fig. 5 is a fragmentary view showing—partly in section—a portion of an accumulator with plates according to Figs. 3 and 4, and showing the left hand plate with a conducting member 12 of sheet metal in close contact with the lead sheet 1, and with a conductor plate 13 extending over the marginal edges of said sheet 12 and a conductor 14 extending from one of the marginal edges of the plate 13 to a terminal 15 which extends through the end cover 16 of the accumulator.

In mounting the individual electrode plates to form the accumulator, the frames 4 are fused together or are cemented to each other by a suitable cementing agent. The frames are usually made of a thermo-plastic and a tight joint between the engaging parts of the frames is very readily obtained. The end frames 4 and the covers 16 of a similar or like material are assembled by fusing or by cementing or sticking such parts together.

I claim as my invention:

1. An electric accumulator of the bipolar type having a plurality of vertical electrode plates stacked against each other between terminal plates, each electrode plate comprising a thin lead sheet, a grating of insulating material on each side of said sheet, positive and negative active materials impressed in the meshes of said gratings, a frame around the edge of said gratings and having flanges projecting from one electrode to an adjacent electrode, said flanges having a height exceeding the total thickness of the lead sheet with surrounding gratings, and parallel vertical walls extending between adjacent plates close to the vertical boundaries of the active part of the electrode plate.

2. An electric accumulator of the bipolar type having a plurality of vertical electrode plates stacked against each other between terminal plates, each electrode plate comprising a thin lead sheet, a grating of insulating material on each side of said sheet, positive and negative active materials impressed in the meshes of said gratings, a frame around the edges of said gratings and having flanges projecting from one electrode to an adjacent electrode, said flanges having a height exceeding the total thickness of the lead sheet with surrounding gratings, and external cooling fins on the vertical sides of the frame.

3. An electric accumulator of the bipolar type having a plurality of vertical electrode plates stacked against each other between terminal plates, each electrode plate comprising a thin lead sheet, a grating of insulating material on each side of said sheet, positive and negative active materials impressed in the meshes of said gratings, a frame around the edges of said gratings and having flanges projecting from one electrode to an adjacent electrode, said flanges having a height exceeding the total thickness of the lead sheet with surrounding gratings, and parallel vertical walls extending between adjacent plates close to the vertical boundaries of the active part of the electrode plate, said walls being integral with the frame.

WILHELM GEORG SCHMIDT.

REFERENCES CITED

The following references are of record in the file of this patent:

UNITED STATES PATENTS

| Number | Name | Date |
|---|---|---|
| 553,596 | Ribbe | Jan. 28, 1896 |
| 618,247 | Dolter | Jan. 24, 1899 |
| 650,886 | Wiegand | June 5, 1900 |
| 1,075,897 | Chamberlain et al. | Oct. 14, 1913 |
| 1,584,248 | Spencer | May 11, 1926 |
| 1,766,026 | Klock | June 24, 1930 |

FOREIGN PATENTS

| Number | Country | Date |
|---|---|---|
| 193,241 | Great Britain | Feb. 22, 1923 |
| 422,921 | Great Britain | Jan. 18, 1935 |